May 12, 1925.
C. NOBS, JR
1,537,489
OPTICAL WASHER AND SCREW
Filed Oct. 16, 1922
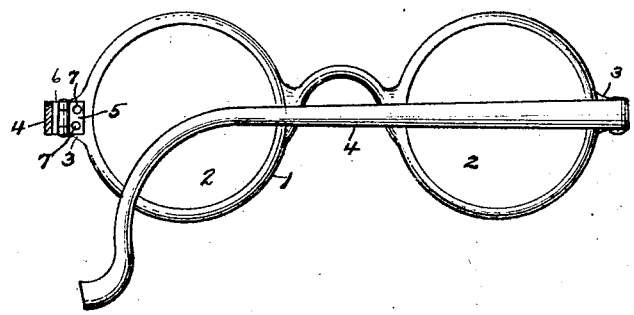
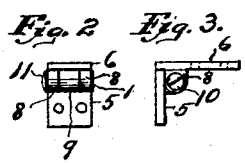
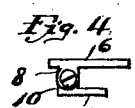
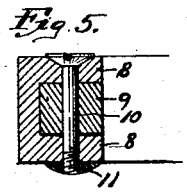
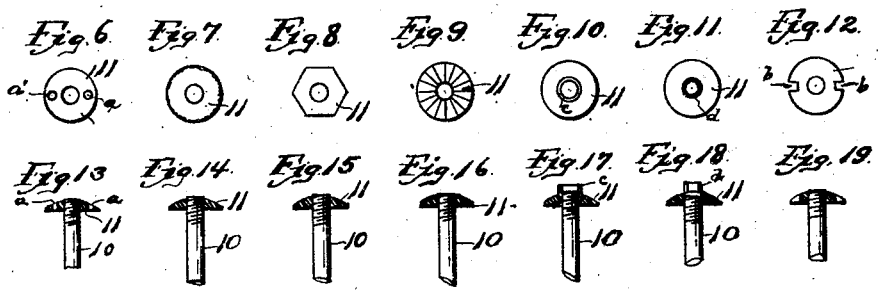
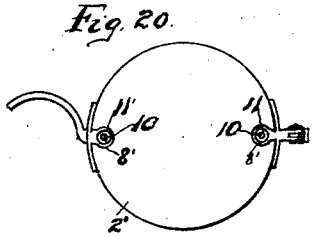
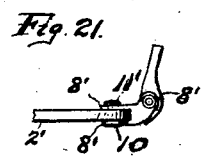
Charles Nobs Jr
INVENTOR.
By
Louis M. Sanders
ATTORNEY.

Patented May 12, 1925.

1,537,489

UNITED STATES PATENT OFFICE.

CHARLES NOBS, JR., OF NEWARK, NEW JERSEY, ASSIGNOR TO CHARLES NOBS & SON, OF NEWARK, NEW JERSEY, A CORPORATION OF NEW JERSEY.

OPTICAL WASHER AND SCREW.

Application filed October 16, 1922. Serial No. 594,720.

*To all whom it may concern:*

Be it known that I, CHARLES NOBS, Jr., a citizen of the United States, residing in the city of Newark, county of Essex, and State of New Jersey, have invented a new and useful Improvement in Optical Washers and Screws, of which the following is a specification.

My invention relates to devices for securing the parts of optical frames together, such as the temples to spectacle frames or the bridge to the lenses, and its purpose is to overcome the difficulties and objections to the present form of screws, rivets and pins, almost universally used for the purpose. In the assembly of the parts of the spectacles, and the polishing of the frames upon the usual buffing wheel, particles of the polishing materials, such as powdered pumice, will accumulate in the screw holes and in the threads of the screws, so that the threads are destroyed and the screws rendered useless when an attempt is made to separate the parts, as for repairs. This makes it necessary to re-drill and retap the holes and supply a special screw of larger size to take the place of the one discarded. Sometimes in attempting to overcome the difficulty, the repairer will upset the end of the screw by pinching it between pliers to distort the screw into an oval so as to enlarge its diameter in one direction in order that its threads may take hold in the screw hole. This is but a temporary makeshift, and soon the parts become loose and are only weakened upon being re-tightened. The difficulty may almost invariably be traced to the grits in the polishing material accumulating in the pivots and screw holes, where they continue to grind whenever the parts are relatively shifted or moved, and in consequence the threads upon the screw or in the screw hole become useless. The delicacy of the parts is such that the slightest weakening of a connection will be followed shortly by complete uselessness.

My improvement consists in providing a screw slightly longer than the width of the hinge element through which it is to be inserted, and then placing a screw-threaded washer upon the exposed end of the screw, and screwing the same firmly against the face of the hinge element, and thereafter filing off the projecting end of the screw to make a neat finish. The accumulation of the polishing grit in the screw holes or in the threads is thereby effectually prevented and the difficulty hitherto encountered is completely overcome.

In carrying out my improvement, I make use of the forms and structures illustrated in the accompanying drawing.

Fig. 1 is a plan view of a well-known type of spectacle with a zylonite frame. One of the temples is broken away to show the location and one of the uses of my improvement.

Fig. 2 is an end view of the usual form of hinge for connecting the temples to the frame, but with my improvement therein.

Fig. 3 is a plan view of the same.

Fig. 4 is a plan of the hinge closed.

Fig. 5 is an enlarged section of the hinge showing the screw and washer in place.

Figs. 6 to 12 inclusive illustrate in plan, and Figs. 13 to 19 inclusive illustrate in section several of the different forms which the washer may take to accomplish the object of my invention.

Fig. 20 show the application of the screw and washer to the bridge and temple of a skeleton frame spectacle.

Fig. 21 is a plan view of the temple connection.

Similar reference characters refer to like parts throughout the specification and drawing.

In Fig. 1 I have shown a well-known type of spectacle frame, with one of the temples broken away to show the location and one of the uses of my invention. The frame 1 may be of any usual or preferred form and material, having the lenses 2, 2 therein, and with the end projections 3, 3, to which the temples 4, 4 are hinged. In the present case, the hinge is a separate member made up of the two elements 5, 6, which are permanently secured to the frame and temples by means of the rivets 7, 7. The two hinge members have the usual intermeshing apertured hinge lugs 8, 8 and 9 respectively, through which the headed pintle screw 10 is inserted. Hitherto, it has been the practice to thread one of the lugs and counterbore the other so that the screw could be inserted therein and screwed into the threaded lug. The frequent opening and closing of the temple has a tendency to loosen the screw in the lug and wear the threads so that they become useless. Coupled with the fact that more often than otherwise some of the polishing grit will have accumulated in the threads, this frequent relative movement, and consequent wearing of the parts soon makes repair necessary. To overcome this difficulty, I extend the screw 10 slightly beyond the face of the apertured lug 8, and mount thereon the screw-threaded washer 11, screwing the same home against the face of the lug. This serves to firmly fix the screw in place, and prevents the movement of the lug 9 from loosening it. The lug 8 may be threaded and the screw 10 turned therein, or the threading of the lug may be omitted as desired. The broad face of the washer bearing upon the face of the lug 8 introduces a sufficient frictional engagement to prevent the relative movement of the lug 9 from turning the screw, no matter how much the lug 9 may be cramped or twisted. The result of the introduction of the washer and screw construction has been a complete obviation of the difficulty above noted.

While the improved washer and screw as above described are particularly designed for the hinge connection of spectacles yet they are equally adapted for securing the bridge and temples to the lenses of skeleton frame spectacles, as clearly shown in Figs. 20 and 21. Here the bridge lugs 8', 8' extend upon each side of the lens 2', with the screw 10' passing through the apertures therein and secured in place by the screw threaded washer 11'. The temple piece 12 may be secured to the lens in exactly the same manner and further description thereof is deemed unnecessary.

While the preferred form of the washer 11 is as shown in Fig. 5, i. e., flat upon its contact face and rounded upon its exposed face, yet it is obvious that it may take other forms and still accomplish the purpose of my invention. The preferred form may be preserved, and a pair of minute apertures $a$, $a$ may be provided in which to insert the points of a pair of dividers, so that the washer may be conveniently turned, as shown in Figs. 6 and 13; or open slots may be provided as shown in Figs. 12 and 19 for the same purpose. The edge of the washer may be knurled as shown in Figs. 7 and 14, or made polygonal as shown in Figs. 8 and 15, to facilitate the turning of the washer upon the screw. In order to increase the frictional engagement between the flat face of the washer and the face of the lug 8, this flat face may be radially corrugated, as shown in Figs. 9 and 16.

In Figs. 10 and 17 the washer is shown as provided with a small annular projection surrounding the aperture, and when the washer is screwed home, this projection may be spun down over the end of the screw to add to the finished appearance.

In Figs. 11 and 18, the end of the screw is shown as slightly counterbored to provide a small annular projection beyond the face of the washer, as at $d$, which may be spun down over the face of the washer to prevent accidental unscrewing.

Many other forms will be readily suggested to those skilled in the art, which will come within the scope of my improvement.

The device may be produced at a very reasonable cost, and a material saving in cost of repairs be effected by its use, as well as a saving in "returns" of defective work.

I claim:—

1. In an optical frame connection, the combination with the frame, of an apertured hinge element secured to said frame, a temple having a hinge element secured thereto, said hinge elements adapted to inter-engage with their apertures in registry, a pintle screw inserted through said registering apertures, and a screw-threaded washer upon the exposed end of said screw for securing said temple and frame in permanent pivotal relation to each other, said washer having an annular projection surrounding its aperture, said projection adapted to be spun down over the end of said screw.

2. An optical washer and screw comprising a headed and threaded screw, and a threaded washer adapted to be screwed upon said screw, said washer having a rounded outer surface and an annular projection upon its outer surface adapted to be spun down over the end of a screw.

3. An optical washer and screw comprising a headed and threaded screw, a threaded washer adapted to be screwed upon said screw, said washer having a rounded outer surface and means thereon to facilitate the turning of said washer and an annular projection on said washer adapted to be spun down over the end of a screw.

CHARLES NOBS, Jr.